United States Patent
Chen et al.

(10) Patent No.: US 10,777,008 B2
(45) Date of Patent: Sep. 15, 2020

(54) DRONES GENERATING VARIOUS AIR FLOW EFFECTS AROUND A VIRTUAL REALITY OR AUGMENTED REALITY USER

(71) Applicant: Disney Enterprises, Inc., Burbank, CA (US)

(72) Inventors: Alexander C. Chen, Burbank, CA (US); Steven Chapman, Burbank, CA (US); Benjamin Havey, Burbank, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 320 days.

(21) Appl. No.: 15/879,372

(22) Filed: Jan. 24, 2018

(65) Prior Publication Data

US 2019/0066359 A1    Feb. 28, 2019

Related U.S. Application Data

(60) Provisional application No. 62/553,072, filed on Aug. 31, 2017.

(51) Int. Cl.
*G06T 19/00* (2011.01)
*G06T 15/20* (2011.01)
(Continued)

(52) U.S. Cl.
CPC ............ *G06T 19/006* (2013.01); *A63F 13/25* (2014.09); *A63F 13/26* (2014.09); *A63F 13/28* (2014.09);
(Continued)

(58) Field of Classification Search
CPC ..... G06T 9/006; G06T 15/20; G06T 2215/16; B25J 9/1605; G06F 3/016; G06F 3/011;
(Continued)

(56) References Cited

U.S. PATENT DOCUMENTS 7,806,371 B2    10/2010    Troutman
9,776,100 B2    10/2017    Wong et al.
(Continued)

FOREIGN PATENT DOCUMENTS

CN        103212211 A        7/2013

OTHER PUBLICATIONS

Cardin, S. et al., "Head Mounted Wind", https://infoscience.epfl.ch/record/104359/, Jun. 13, 2007, 7 pages.
(Continued)

*Primary Examiner* — Dale W Hilgendorf
(74) *Attorney, Agent, or Firm* — Dorsey & Whitney LLP

(57) ABSTRACT

Systems and methods described herein are directed to enhancing a virtual reality (VR) or augmented reality (AR) experience by using one or more unmanned vehicles to generate effects around a user of a headmounted display (HMD). The generated effects may be synchronized with VR/AR content presented to the user of the HMD. Particular systems and methods described herein are directed to enhancing a VR/AR experience by using one or more unmanned aerial vehicles (UAV) to generate air flow effects around a user of a HMD. The air flow effects generated by UAV may simulate a physical and/or olfactory sensation corresponding to a VR/AR environment presented to the user using the HMD.

22 Claims, 9 Drawing Sheets

(51) Int. Cl.
*A63F 13/25* (2014.01)
*G06F 3/01* (2006.01)
*A63F 13/28* (2014.01)
*A63F 13/26* (2014.01)
*B25J 9/16* (2006.01)
*G05D 1/00* (2006.01)
*B64C 39/02* (2006.01)
*G02B 27/01* (2006.01)

(52) U.S. Cl.
CPC .......... *B25J 9/1605* (2013.01); *G05D 1/0094* (2013.01); *G06F 3/011* (2013.01); *G06F 3/016* (2013.01); *G06T 15/20* (2013.01); *A63F 2300/8082* (2013.01); *B64C 39/024* (2013.01); *G02B 27/017* (2013.01); *G06T 2215/16* (2013.01)

(58) Field of Classification Search
CPC .......... A63F 13/26; A63F 13/28; A63F 13/25; A63F 2300/8082; G02B 27/017; B64C 39/024; G05D 1/0094
See application file for complete search history.

(56) References Cited

U.S. PATENT DOCUMENTS

| | | |
|---|---|---|
| 9,836,117 B2 | 12/2017 | Shapira |
| 2008/0153591 A1 | 6/2008 | Deligiannidis |
| 2009/0156307 A1 | 6/2009 | Aguirre et al. |
| 2013/0038599 A1 | 2/2013 | Krakowski |
| 2014/0272915 A1 | 9/2014 | Higashino et al. |
| 2015/0181819 A1 | 7/2015 | Celebi et al. |
| 2016/0026253 A1 | 1/2016 | Bradski et al. |
| 2016/0054837 A1* | 2/2016 | Stafford .................. G06F 3/012 463/33 |
| 2016/0304217 A1 | 10/2016 | Fisher et al. |
| 2016/0349835 A1* | 12/2016 | Shapira .................. G06F 3/011 |
| 2017/0056784 A1 | 3/2017 | Cortelyou et al. |
| 2017/0127652 A1* | 5/2017 | Shen et al. ............ B64C 39/024 |
| 2017/0137125 A1* | 5/2017 | Kales .................... B64C 39/024 |
| 2017/0161561 A1 | 6/2017 | Marty et al. |
| 2017/0178469 A1 | 6/2017 | Nahman et al. |
| 2017/0182407 A1 | 6/2017 | Steele et al. |
| 2017/0193707 A1* | 7/2017 | Seiler .................... B64C 39/024 |
| 2017/0266676 A1 | 9/2017 | Fateh |
| 2017/0270971 A1 | 9/2017 | Anderson |
| 2017/0305547 A1* | 10/2017 | Tamkin, Sr. .......... B64C 39/024 |
| 2017/0322628 A1 | 11/2017 | Tan et al. |

OTHER PUBLICATIONS

Ng, Wai S., "Collocated Interaction with Flying Robots", 20th IEEE International Symposium on Robot and Human Interactive Communication, Atlanta, GA, USA, Jul. 31-Aug. 3, 2011, 7 pages.

* cited by examiner

AIR FLOW GENERATOR CONFIGURATION    AIR FLOW EFFECT
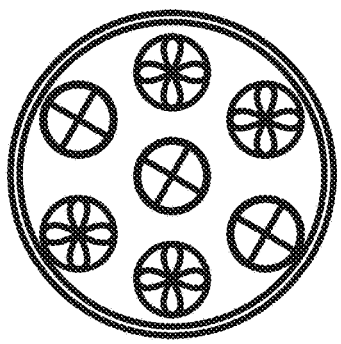 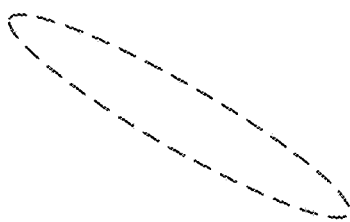    FIG. 3A
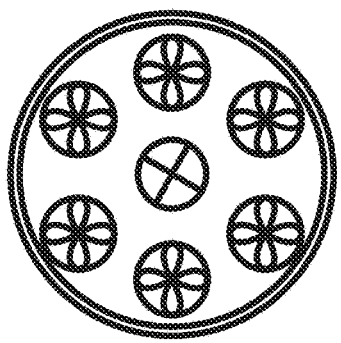     FIG. 3B
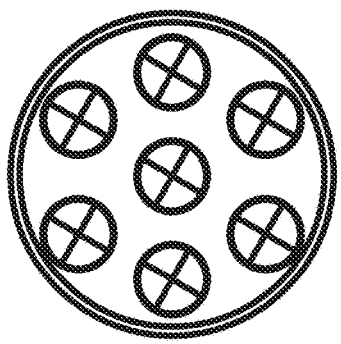 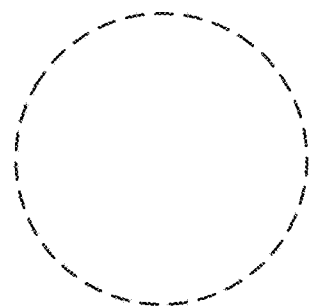    FIG. 3C
 GENERATOR ON
 GENERATOR OFF

DRONES GENERATING VARIOUS AIR FLOW EFFECTS AROUND A VIRTUAL REALITY OR AUGMENTED REALITY USER

CROSS-REFERENCE TO RELATED APPLICATIONS

This application claims the benefit of U.S. Provisional Patent Application No. 62/553,072, filed Aug. 31, 2017, which is incorporated herein by reference in its entirety.

BRIEF SUMMARY OF THE DISCLOSURE

Techniques described herein are directed to enhancing a virtual reality (VR) or augmented reality (AR) experience by using one or more unmanned vehicles to generate effects around a user of a headmounted display (HMD).

In one embodiment, a method includes: communicatively coupling an unmanned vehicle to a VR system including a VR HMD; determining a desired physical effect to be generated on a user of the VR HMD; based on at least the desired physical effect, positioning the unmanned vehicle relative to the position of the user of the VR HMD and configuring the unmanned vehicle in preparation for generating the physical effect; and after positioning the unmanned vehicle, generating a physical effect on the user of the VR HMD.

In implementations, the method may further include: presenting VR content on a display of the VR HMD; and synchronizing presentation of the VR content with the generation of the physical effect on the user of the VR HMD. In implementations, the generated physical effect may simulate a part of the presented VR content. The physical effect may be generated in response to the user interacting with VR content presented on the display of the VR HMD or the physical effect may generated in response to video content presented on the VR HMD reaching a predetermined time.

In implementations, the unmanned vehicle is an unmanned aerial vehicle (UAV), the UAV including an air flow unit including at least one air flow generator, where the desired physical effect is a desired air flow effect, where the generated physical effect is an air flow effect, and where configuring the unmanned vehicle in preparation for generating the desired air flow effect includes: configuring air flow parameters of the air flow unit of the UAV.

In implementations utilizing an UAV, the method may further include: using at least the desired air flow effect: positioning a second UAV relative to a position of the user of the VR HMD; and after positioning the second UAV, using the second UAV to generate an air flow effect, where the air flow effect generated by the first UAV and the air flow effect generated by the second UAV are synchronized in time. The UAVs may be positioned in a column such that the first and second air flow effects are combined to generate a stronger air flow effect. The UAVs may also be positioned side-to-side to generate an air flow effect simulating the air movement of a linear object and/or to generate wider air flow effect.

In implementations utilizing an UAV, the air flow unit may include multiple air flow generators. In some implementations, the airflow generators may be rotatable to a first position to combine airflows produced by the airflow generators to generate a stronger airflow effect, and the airflow generators may also be rotatable to a second position to generate a wider air flow effect. In some implementations, configuring the air flow parameters of the air flow unit may include: activating a predetermined number of air flow generators based on a desired air flow effect.

In some implementations, generating the air flow effect may include: generating mist and/or smell. In some implementations, the generated air flow effect may simulate a part of the presented VR content.

In some implementations utilizing the UAV, the method may further include: positioning a second UAV carrying an object such that the object contacts the user of the VR HMD during generation of the air flow effect. In this implementation, the method may further include: presenting VR content on a display of the VR HMD; and synchronizing presentation of the VR content with the object contacting the user.

Other features and aspects of the disclosed method will become apparent from the following detailed description, taken in conjunction with the accompanying drawings, which illustrate, by way of example, the features in accordance with embodiments of the disclosure. The summary is not intended to limit the scope of the claimed disclosure, which is defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments of the disclosure.

FIG. 3A illustrates an example configuration of an air flow generator that may be used in particular embodiments of the application.

FIG. 3B illustrates an example configuration of an air flow generator that may be used in particular embodiments of the application.

FIG. 3C illustrates an example configuration of an air flow generator that may be used in particular embodiments of the application.

The figures are not exhaustive and do not limit the disclosure to the precise form disclosed.

DETAILED DESCRIPTION

Embodiments described herein are directed to enhancing a virtual reality (VR) or augmented reality (AR) experience by using one or more unmanned vehicles to generate effects around a user of a headmounted display (HMD). For example, unmanned aerial vehicles (UAVs) such as drones, unmanned terrestrial vehicles with wheels, vehicles that are movably coupled to a ceiling, wall, or floor (e.g., along a track), and other vehicles may be positioned relative to a user of a HMD to generate olfactory, auditory, and sensory effects that are synchronized with a VR/AR experience presented to the user. Embodiments of this disclosure are described herein and shown in the Figures for VR systems, but these embodiments may also be implemented with AR systems.

Particular embodiments described herein are directed to enhancing a VR experience by using one or more UAV to generate air flow effects around a user of a VR HMD. The air flow effects generated by UAV may simulate a physical and/or olfactory sensation corresponding to a VR environment presented to the user using the VR HMD. For example, an air flow effect generated by the UAV may correspond to a sword slash, a punch, passing objects, wind, odor, or other experience corresponding to the VR environment. In yet further implementations, the one or more UAV may be mounted with physical objects (e.g., leaves, balls, paper, etc.) adapted to contact the user, thereby further enhancing the user's VR experience.

The use of UAVs may provide several advantages in this environment. First, the air flow effects that are generated and felt by the user of the HMD are not limited by the position of the user (as would be the case for fixed air flow generators). Rather, one or more UAVs may navigate to a position relative to a user at any time during the user's VR experience. This may enhance the realism of the user's VR experience as the air flow effects can be generated at any time and come from any direction, permitting a more interactive and less scripted VR experience.

Second, the realism of the air flow effects may be enhanced by the flexibility of having UAV that can navigate to any position in combination with a VR HMD that presents the user with a VR experience that does not show the UAVs.

Third, the use of UAV vehicles provides a flexible and dynamic system that may provide a VR experience in any environment, including an open room, that does not limit the user to navigating a particular set of rooms in a particular order. For example, unlike other systems for generating real-world special effects, the user is not required to traverse a path or maze that generates predetermined effects at predetermined positions along the path or within the maze. Rather, the effects may be brought to the user regardless of where the user is and their path between different points.

Figure 1A:
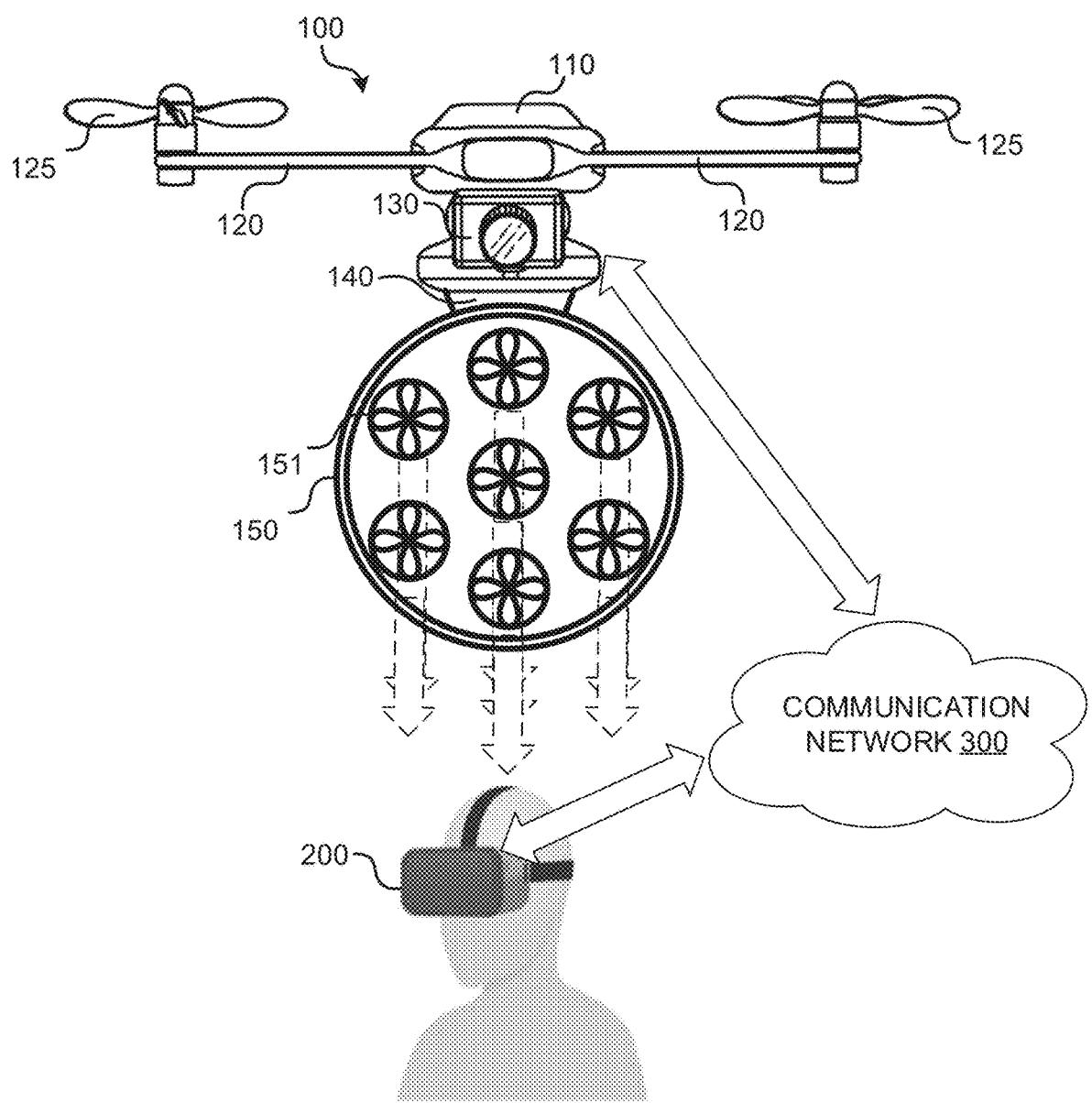
FIG. 1A illustrates a high-level block diagram of an exemplary system in accordance with the present disclosure.
Figure 1B:
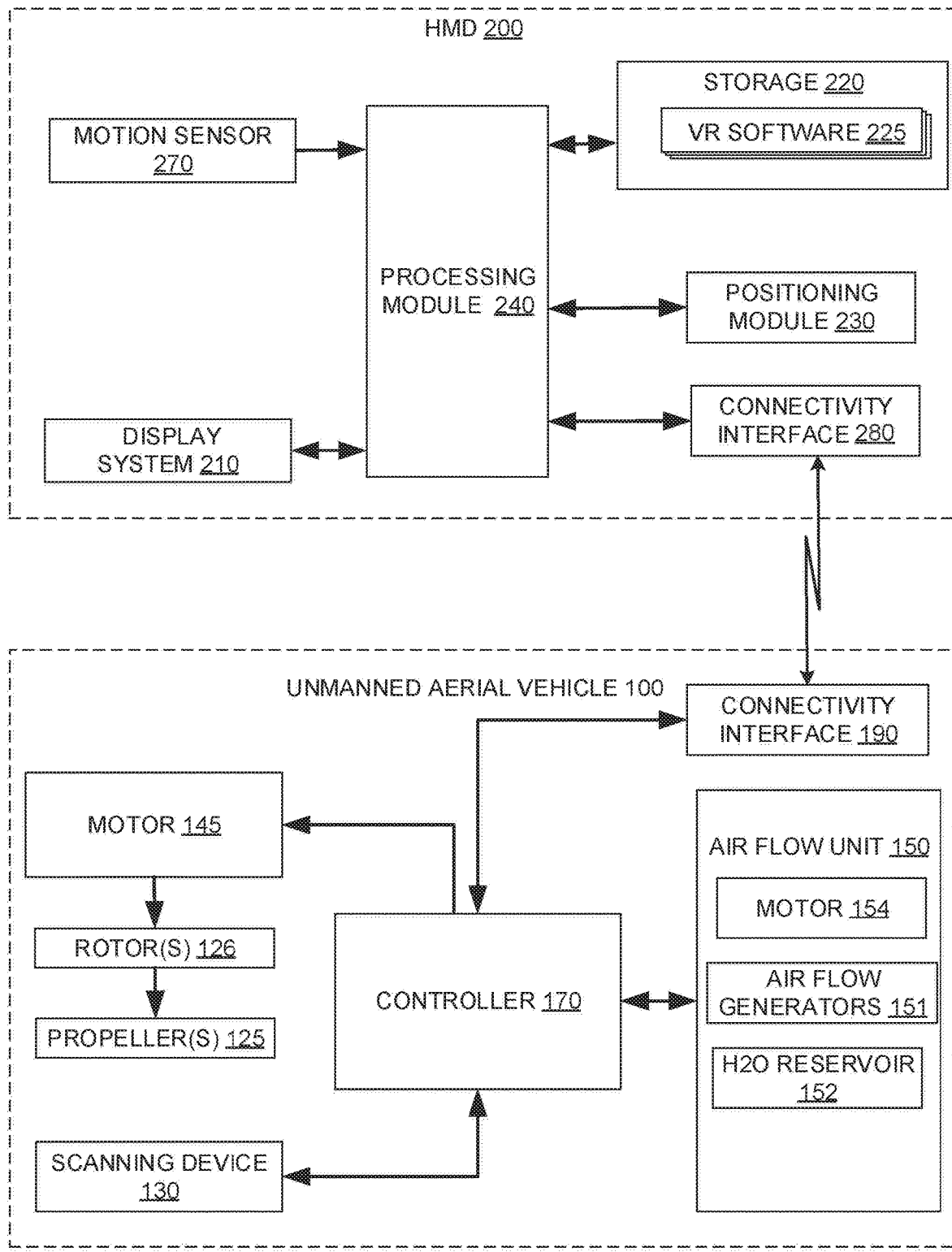
FIG. 1B is a block diagram illustrating an example architecture for components of a head mounted display and an unmanned aerial vehicle (UAV) that may be implemented in the system of FIG. 1A.

FIG. 1A illustrates a high-level block diagram of an exemplary system in accordance with the present disclosure. In this example system, one or more UAVs 100 mounted with an air flow unit 150 communicatively couple to a VR HMD 200 over communication network 300. For example, UAV 100 may communicatively couple to VR HMD 200 over a BLUETOOTH network, a WIFI network, a ZIGBEE network, or other suitable wireless communications network. In some implementations, an intermediary device (not shown) such as a server, a desktop computer, a smartphone, a hub, and the like may communicatively couple to UAV 100 and/or VR HMD 200 to direct and/or synchronize actions taken by UAV 100 and/or VR HMD 200. For example, the HMD may be in communication with a desktop computer or computer cluster that generates and renders the virtual world displayed by the HMD and coordinates those actions with the movement of the UAV. FIG. 1A will be described together with FIG. 1B, which is a block diagram illustrating an example architecture for components of a VR HMD 200 and an UAV 100 that may be implemented in the system of FIG. 1A.

VR HMD 200 presents a VR experience to the user (e.g., a video, a video game, a VR application, etc.) During presentation of the VR experience, UAV 100 may receive instructions to move into a position relative to the user of the VR HMD 200 and generate air flow effects on the user corresponding to the VR content presented to the user. For example, a VR video may be time synchronized with an air flow effects file containing instructions that cause UAV 100 to generate air flow effects on the user at particular positions during particular times of the VR video. As another example, a particular action taken by a user of HMD 200 during presentation of an interactive VR experience may trigger an instruction to the UAV 100 to utilize air flow unit 150 to generate an air flow effect on the user. As would be appreciated from the foregoing examples, a variety of predetermined events during presentation of the VR experience may trigger generation of an air flow effect. However, it should be noted that in some implementations air flow effects may be generated independently of the VR content that is being presented to the user.

The air flow effects may be generated, for example, by using one or more air flow generators 151 of air flow unit 150 to pull in or blow out air in a particular shape at a particular pressure, generating mist, generating cold or hot air relative to the ambient air temperature, generating a smell, or some combination thereof. In some instances, multiple UAVs 100 may be synchronized to generate one or more air flow effects.

In some implementations, machine-readable instructions that cause UAV 100 to generate air flow effects may be embedded in one or more files used to present the VR experience to the user. The instructions to generate the air flow effects may be transmitted by a device (e.g. VR HMD 200 or an intermediary device) to UAV 100 over communication network 300. In some implementations, UAV 100 may store all or a subset of the instructions. The instructions may specify the type of air flow effect, the configuration of air flow generators 151 required to generate the air flow effect, the position of air flow unit 150 relative to the user when the air flow effect is generated, and other parameters of the air flow effect.

In implementations, UAV 100 may automatically move into position to generate the air flow effect (e.g., in response to receiving machine-readable instructions) or UAV 100 may be manually controlled by a user (i.e., using a remote control) or a computer (e.g., an intermediary device coupling to VR HMD 200 and UAV 100) to move into position and generate a particular air flow effect on the user of the VR HMD 200.

UAV 100 may be a multirotor or multicopter including a controller 170 for controlling the various components of UAV 100, including, for example, a motor/motor driver 145, a scanning device 130, an air flow unit 150, a connectivity interface 190, and a storage (not shown). Under operation by controller 170, a motor/motor driver 145 may power more than two rotors 126 that cause propellers 125 to rotate. For example, UAV 100 may be a tricopter, quadcopter, hexacopter, octocopter, etc. In the example of FIG. 1A, which shows a front side plan view of UAV 100, UAV 100 is illustrated as a quadcopter having arms 120 that couple rotors 126 to UAV body 110.

Motion of UAV 100 through the air may be achieved by adjusting the magnitude of the thrust (i.e., speed of rotation) of each rotor 126 and the relative thrust between each rotor 126. For example, UAV 100 may ascend by increasing the thrust of rotors 126 until a force that is greater than gravitational force on the UAV is produced. As another example, UAV 100 may turn (rotate) by producing a greater or lower thrust in one rotor relative to another rotor that rotates in an opposite direction. In some alternative implementations, UAV 100 may be a single or double-rotor helicopter (e.g., one that uses variable pitch rotors) or other suitable aerial vehicle that may be mounted with an air flow unit 150 and used in the environment of FIGS. 1A and 1B to enhance the VR experience of the user.

Air flow unit 150 may be removably or fixedly attached to UAV 100 at joint 140 and may include one or more air flow generators 151, an H2O reservoir 152, and a motor/motor driver 154 for driving air flow generators 151. In alternative implementations, motor/motor driver 145 may drive air flow generators 151. Air flow generators 151 may push and/or pull air and may be bladeless or bladed as illustrated in FIG. 1A (e.g., fans). In some implementations, air flow generators 151 may include a tilt actuator and/or slats for controlling the direction and profile in which air is pushed out or vacuumed. In implementations where multiple air flow generators 151 are used with an air flow unit 150, air flow generators 151 may be operated independently, e.g., turned on, turned off, operated at a particular intensity, etc.

In implementations, liquid stored in an H2O reservoir 152 may be used to produce mist (e.g., through slots or vents in air flow generators 151). In yet further implementations, air flow unit 150 may include a reservoir (not shown) for storing smelling agents. For example, during generation of an air flow effect including smell (e.g., simulation of a pine tree smell), the reservoir may be opened and vented through air flow unit 150 in a direction of the user of VR HMD 200.

In some implementations, joint 140 may include a tilt actuator that permits further positioning of air flow unit 150 relative to a user of VR HMD 200.

Scanning device 130 may allow UAV 100 to navigate autonomously and position itself relative to the user of VR HMD 200. For example, scanning device 130 may include a video camera that captures the environment including the user of VR HMD 200. During video capture, photogrammetry techniques may be applied to the captured video to determine the relative positioning of UAV 100 and the user of VR HMD 200. As another example, scanning device 130 may include a LIDAR unit including a laser and sensor. As UAV 100 traverses the environment (e.g., circles the user), the laser may emit pulsed light that is reflected back to the sensor, and differences in wavelengths and/or return times of the reflected laser as measured by the sensor may be used to subsequently generate a 3D point cloud and model of the environment, including the user. Other examples of 3D scanning technologies that may be utilized include other laser pulsed-based or phase-shift 3D scanning technologies, laser triangulation 3D scanning technologies, and structured light 3D scanning technologies.

In some implementations, the data captured by scanning device 130 may be streamed to an intermediary device that, based on the streamed data (e.g., video of UAV's current position relative to user) instructs the UAV 100 to navigate to particular positions relative to the VR HMD user and/or within the room of the VR HMD user.

In some implementations, the VR HMD user may wear or carry sensors on the body (e.g., on the hands, arms, head, etc.) that facilitate tracking of the user. For example, the user may carry controllers or wear a bracelet that may have a unique signature that may be detected by scanning device 130. Additionally, the sensors worn or carried by the VR HMD user may include position sensors (e.g., one or more gyroscopes, accelerometers, etc.) that generate signals representative of the user's position and/or movement. Any position and/or motion data generated using position sensors may be wirelessly transmitted from the user to the drone and/or an intermediary device that communicates with the drone and/or VR HMD.

VR HMD 200, in various embodiments, is any headmounted system (e.g., a visor, glasses, goggles, head-mounted smartphone, etc.) that may display VR or AR video content. For example, HMD 200 may display a VR view of a computer-generated environment. HMD 200 may comprise a display system 210, storage 220, positioning module 230, processing module 240, motion sensor 270, and connectivity interface 280. Although illustrated in the example of FIGS. 1A-1B as being an untethered headset, HMD 200 may be tethered or untethered. Additionally, depending on the implementation, HMD 200 may calculate the virtual world prior to display, or the virtual world may be calculated by an intermediary device.

Display system 210 may include a VR video display that is not see-through or a display that is partially see-through.

Storage 220 may comprise volatile memory (e.g. RAM), non-volatile memory (e.g. flash storage), or some combination thereof. In various embodiments, storage 220 stores a VR software application 225, that when executed by processing module 240 (e.g., a digital signal processor), generates a VR view on a display of display system 210. The view generated on display system 210 may display a virtual reality environment to the user of VR HMD 200.

Positioning module 230 may comprise one or more devices for retrieving positional information over a network. For example, positioning module 230 may include a global positioning system receiver, a cellular receiver, a network interface card, an altimeter, or some combination thereof. The positional information retrieved by module 230 may be processed by processing module 240 to determine the geographical coordinates of HMD 200. For example, application software installed in storage 220 may use the location of HMD 200 from a GPS reading along with a map of declination (e.g., stored or retrieved from a network) to determine the geographical coordinates of HMD 200.

Motion sensor 270 receives or generates electronic input signals representative of the motion/position of HMD 200. These electronic input signals may be received and processed by circuitry of processing module 240 to determine the motion of a user of HMD 200 and an absolute orientation of HMD 200 in the north-east-south-west (NESW) and up-down planes. Processing module 240 may store this orientation information in storage 220. In various embodiments, motion sensor 270 may comprise one or more gyroscopes, accelerometers, and magnetometers.

Connectivity interface 280 may connect VR HMD 200 UAV 100 through a communication medium. The medium may comprise a wireless network system such as a BLUETOOTH system, a ZIGBEE system, an Infrared (IR) system, a Radio Frequency (RF) system, a wireless local area network, or the like. In further embodiments, connectivity interface 280 may connect HMD 200 to the Internet using a cellular network, a satellite network, a local area network, or some combination thereof.

Figure 2:
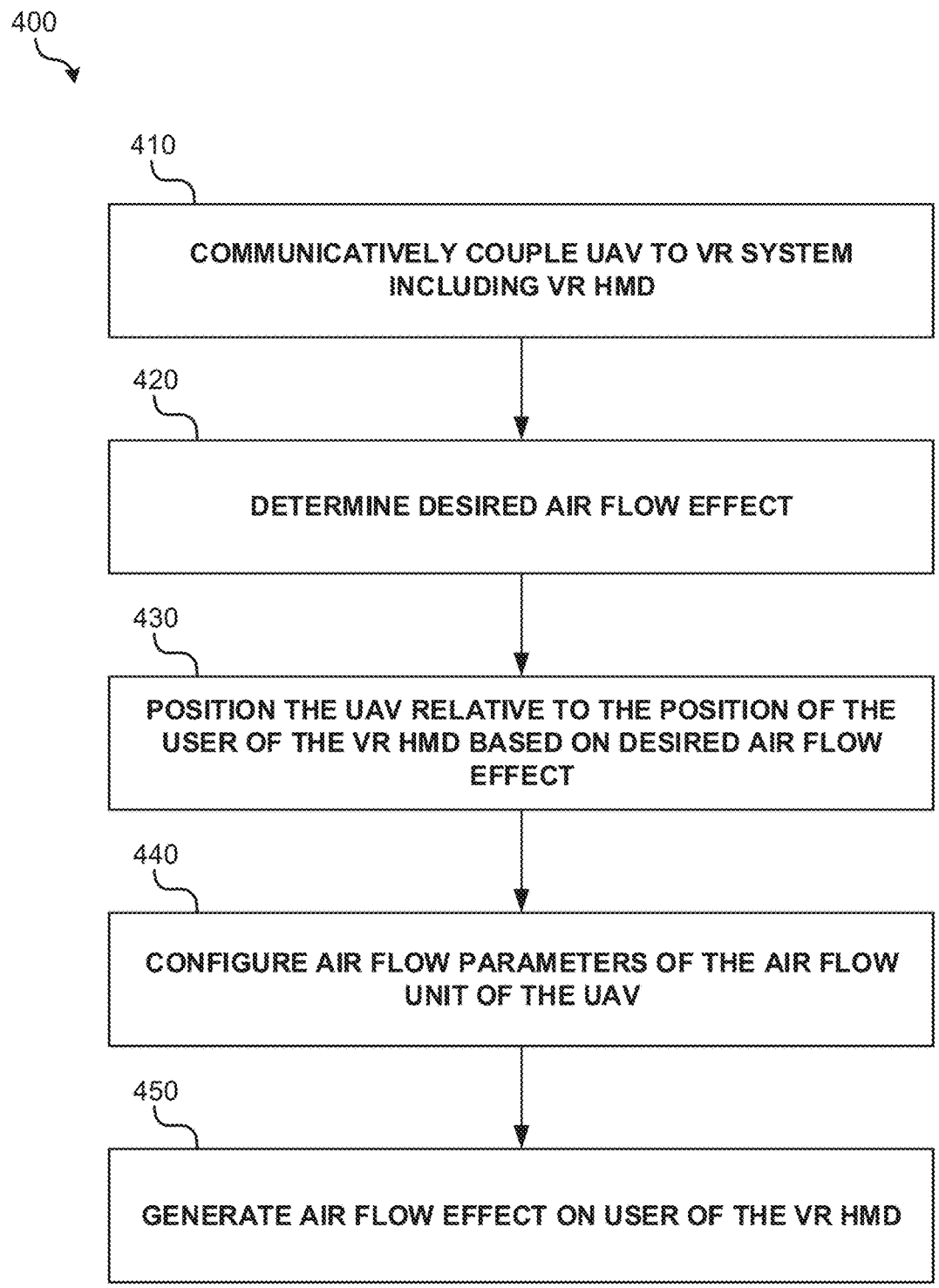
FIG. 2 is an operational flow diagram illustrating an example method that may be implemented in accordance with the disclosure.

FIG. 2 is an operational flow diagram illustrating an example method 400 that may be implemented in accordance with embodiments of the disclosure. At operation 410, a UAV 100 may communicatively couple to a VR system including a VR HMD 200. Communication between UAV 100 and the VR system may allow synchronization between the generated air flow effects and the VR content presented to the user of VR HMD 200.

At operation 420, a processor may determine a desired air flow effect to impart on a user of VR HMD 200. The desired air flow effect may include, for example, a desired intensity and duration of the air flow effect, a desired frequency of occurrence of the air flow effect, a desired shape of the air flow effect, etc. As discussed above, in various embodiments, the desired air flow effect may be based on the VR content that is being presented to the user. For example, the desired air flow effect may be triggered by the time of the content (e.g., a video time code) or by an action taken by the user (e.g., an action taken by the user during an interactive VR presentation). In another example, an air flow effect may be generated based on the user's current position or movement. By way of example, a desired air flow effect may include air movement effects of virtual objects (flying bullets, a swinging sword, explosion, moving animals, wind, rain, sports ball, door opening/closing, vehicle, etc.) around the VR user.

Based on the desired air flow effect, UAV 100 may receive an instruction to move into position to generate the desired air flow effect. At operation 430, UAV 100 may be positioned relative to the user of VR HMD 200 based on a desired air flow effect. For example, UAV 100 may hover directly above the user, to the side of the user, behind the user, level with the user's torso, etc. In implementations, scanning device 130 may be used to accurately position (e.g., distance and direction) UAV 100 relative to the user.

At operation 440, air flow parameters of the air flow unit 150 of UAV 100 may be configured in preparation for generating an air flow effect. For example, air flow generators 151 may be activated or deactivated to a desired intensity setting (e.g., soft as a breeze vs. hard as force blast). Air flow generators 151 may be tilted or otherwise arranged to achieve a desired shape of air flow (e.g. small pinpoint, wide, circular, rectangular, etc.)(see FIG. 3) Air flow unit 150 may be tilted using a tilt actuator; an H2O reservoir may be opened; a smell reservoir may be opened; a thermoelectric heater/cooler may be activated to create a temperature gradient in the air, etc. The generated air flow may be a cold air flow (to simulate a cold environment or object) or a hot air flow (to simulate a hot environment or object).

At operation 450, the desired air flow effect is generated on the user of the VR HMD 200. FIGS. 3A-3C are cross-sectional diagrams illustrating some example shapes of air flow effects that may be generated by configuring (e.g., activating/deactivating) air flow generators 151 of an air flow unit 150 in accordance with embodiments. As illustrated, a substantially rectangular and tilted air flow effect (e.g., one simulating a side sword swipe) may be generated by activating three diagonally oriented air flow generators 151. The X represents activated air flow generators. In FIG. 3B, a small pinpoint air flow effect (e.g., one simulating a light touch or concentrated force) may be generated by activating only a central air flow generator 151 and adjusting the pressure applied by the generator. In FIG. 3C, a large, circular air flow effect (e.g., one simulating a wide blast or gush of wind) may be generating by activating all air flow generators 151.

Figure 3D:
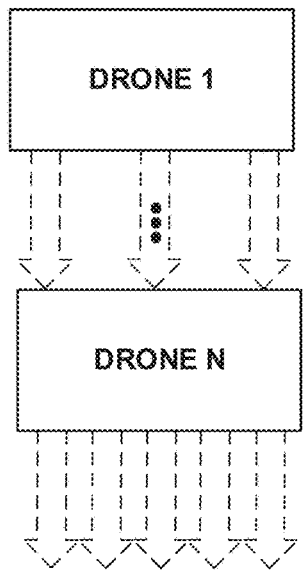
FIG. 3D illustrates a top view of two or more UAVs lining up in a column to generate a stronger air flow.
Figure 3E:
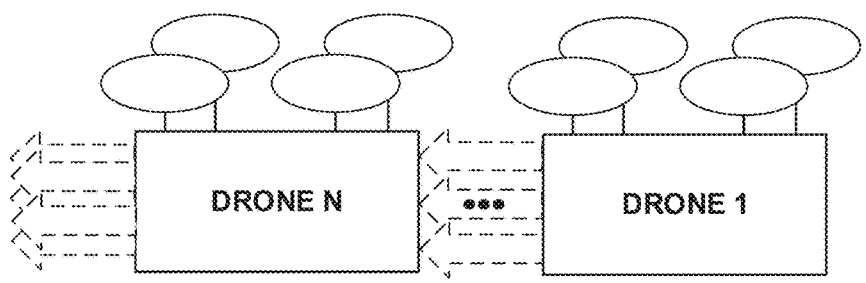
FIG. 3E illustrates a side view of two or more UAVs lining up in a column to generate a stronger air flow.
Figure 3F:
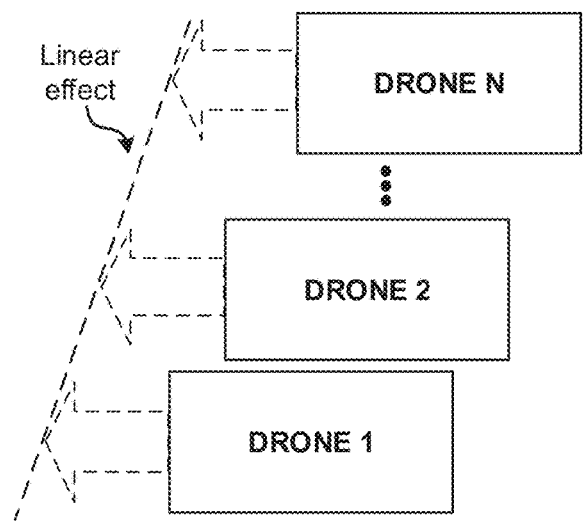
FIG. 3F illustrates a plurality of UAVs lined up side by side to generate a horizontal or linear air flow, to simulate the air movement of a linear object such as a stick, a sword, or tail of an animal.

In some implementations, a plurality of UAVs may line up in a column to collectively generate a stronger air flow at the user, where the air flow of one UAV is added to the air flow of another UAV. FIG. 3D-3E, illustrate a top view (FIG. 3D) and side view (FIG. 3E) of two or more UAVs lining up in a column. In some implementations, illustrated by FIG. 3F, a plurality of UAVs may line up side by side to generate a horizontal or linear air flow, to simulate the air movement of a linear object such as a stick, a sword, or tail of an animal. Additionally, by lining up a plurality of UAVs, the width of the air flow may be increased.

Figure 3G:
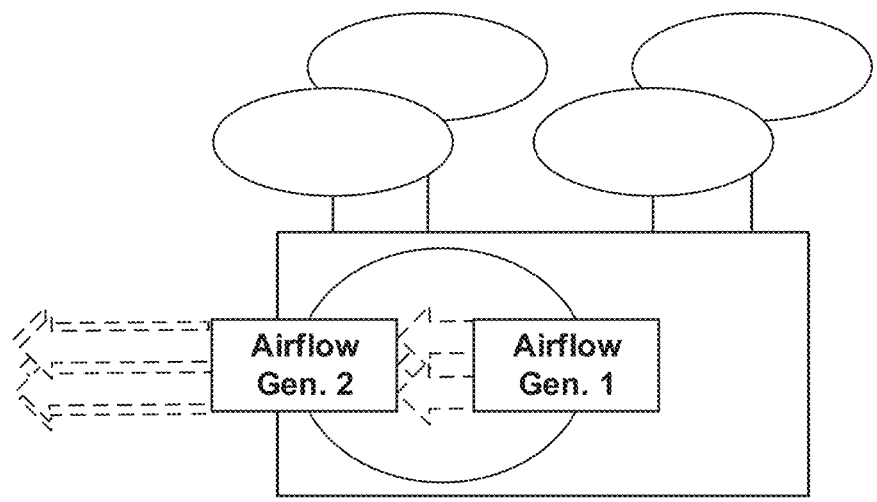
FIG. 3G illustrates a UAV including two rotatable air flow generators that may rotate to 1) a first position where the air flow generators combine air flows to provide a stronger blast of air, and 2) a second position where the air flow generators are side by side and generate a wider air flow.
Figure 3G:
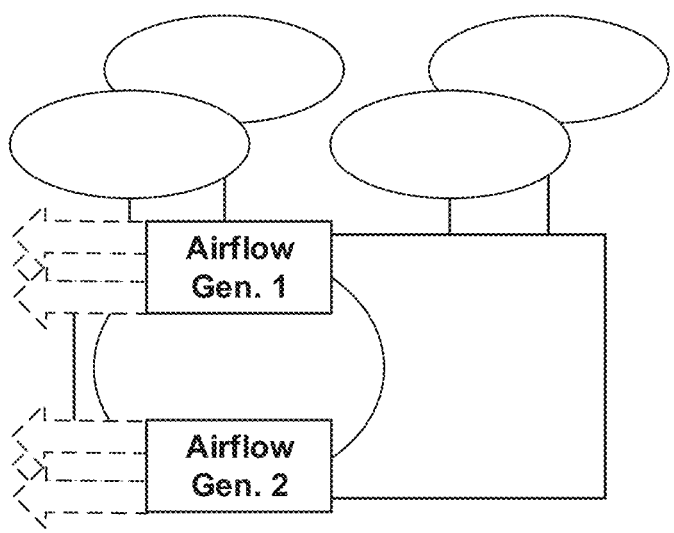

In some implementations, illustrated by FIG. 3G, a UAV may include two or more rotatable air flow generators where the air flow generators can rotate to 1) a first position where the air flow generators combine air flows to provide a stronger blast of air, and 2) a second position where the air flow generators are side by side and generate a wider air flow.

Other examples of air flow effects that may be generated on the user of VR HMD 200 are further described in co-pending U.S. application Ser. No. 15/854,714, titled "Directed Wind Effect for AR/VR Experience," which is incorporated herein by reference.

In further implementations, VR HMD 200 and/or UAV 100 may include a speaker that generates sound effects synchronized to an air flow effect and/or physical object sensation generated by UAV 100.

Figure 4:
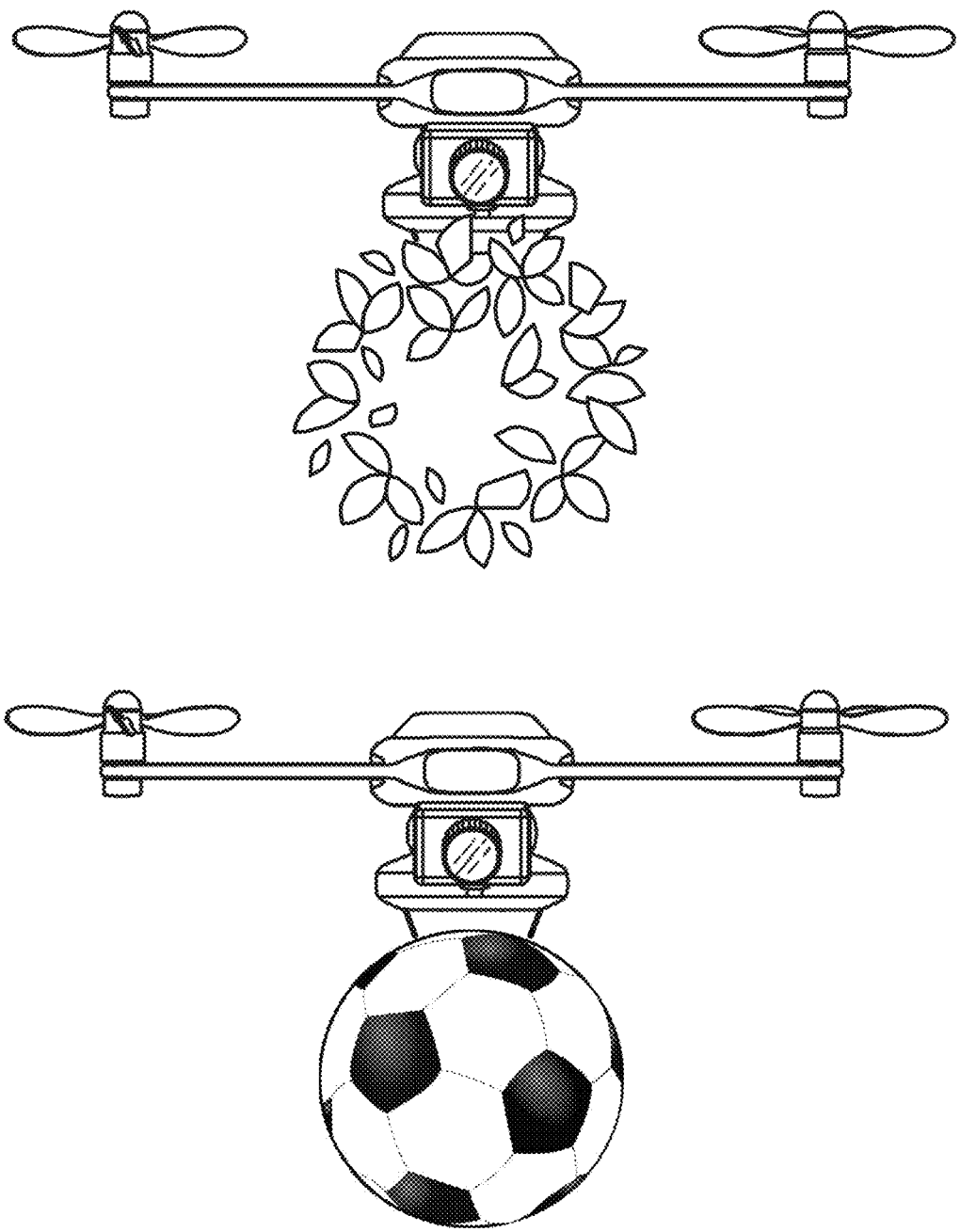
FIG. 4 illustrates an unmanned aerial vehicle mounted with physical objects that may be implemented in particular embodiments of the application.

In some implementations, physical objects (e.g., leaves, balls, paper, foam, etc.) adapted to contact the user may be attached to one or more UAVs 100, thereby further enhancing the user's VR experience. As with the aforementioned air flow effects, the user's physical sensation of the objects may be synchronized with the presentation of VR content to the user using VR HMD 200. FIG. 4 illustrates an example of an UAV 100 carrying different physical objects.

The objects may be removably or fixedly coupled to UAV 100 using a joint 140, a thread, or other suitable means that causes the object to safely contact the user and produce a physical sensation with respect to the user of VR HMD 200. The objects coupled to the UAV 100 may simulate different surfaces that are synchronized to the environment presented to the user of VR HMD. For example, one or more UAV 100 may be mounted with leaves dangling from a thread that simulate the user's presence in a forest or jungle. The objects coupled to the UAV 100 may also simulate different objects that interact with the user in the VR world. For example, a user of VR HMD 200 may be provided with a foam sword that makes contact with a foam proxy held by a UAV 100 that acts like a floating drone trainer.

In implementations where the objects are removably coupled to the UAV 100, the objects may be released in synchronization with the VR experience presented to the user of the VR HMD. For example, objects may be dropped from overhead to simulate objects (e.g., leaves, snow, rain, etc.) that are presented to the user as part of the VR experience. In some implementations, the objects may be grabbed by the user (e.g., in the case of a foam sword) or thrown at the user as projectiles.

In some implementations, haptic devices may be coupled to the objects carried by the UAV 100 and/or an object carried by a user of the VR HMD 200 to further enhance the VR experience.

Figure 5:
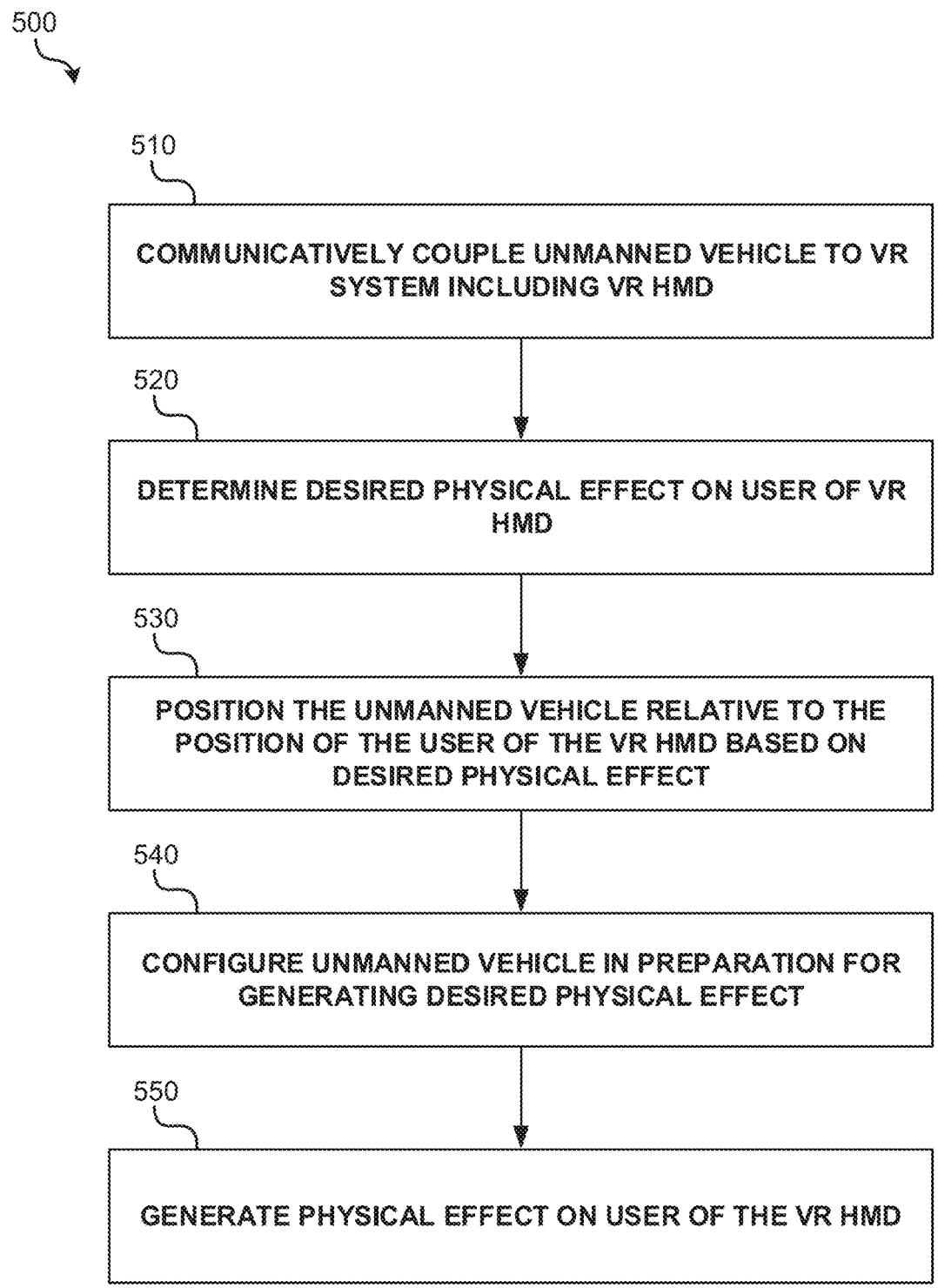
FIG. 5 is an operational flow diagram illustrating an example method that may be implemented using unmanned vehicles in accordance with the disclosure.

Although embodiments described herein have been primarily described in the context of one more UAVs that generate air flow effects around a user of a VR HMD, it should be note that the techniques described herein may be applied using any unmanned vehicle to generate any sensory, olfactory, or auditory effect in the presence of a user of a VR HMD. For example, unmanned terrestrial vehicles with wheels, vehicles that move along tracks, or any other object that is movably attached to a wall, floor, or ceiling may be used to generate effects in the presence of a user of a VR HMD. FIG. 5 is an operational flow diagram illustrating an example method 500 that may be implemented using such unmanned vehicles.

At operation 510, an unmanned vehicle may communicatively couple to a VR system including a VR HMD 200. Communication between the unmanned vehicle and the VR system may allow synchronization between the effects generated by the unmanned vehicle and the VR content presented to the user of VR HMD 200.

At operation 520, a processor may determine a desired effect to impart on a user of VR HMD 200. The desired effect may include, for example, a desired air flow effect as discussed above, a desired physical object sensation (e.g., by contacting the user with a particular object), a desired sound to be played to the user, etc. The desired effect may be based on the VR content that is being presented to the user. For example, the desired effect may be triggered by the time of the content (e.g., a video time code) or by an action taken by the user (e.g., an action taken by the user during an interactive VR presentation). In some implementations, the desired effect may be generated based on the user's current position or movement.

At operation 530, based on the desired effect, the unmanned vehicle may receive an instruction to move into position to generate the desired effect. At operation 540, the unmanned vehicle may be configured in preparation for generating the desired effect. For example, in addition to moving into position, the unmanned vehicle may activate one or more devices or orient itself relative to the user of the VR HMD. At operation 550, the desired physical effect is generated on the user of the VR HMD.

Although techniques described herein have been primarily described with respect to a VR environment, it should be appreciated that the techniques described herein may be similarly applied to a user of an augmented reality (AR) HMD. In such implementations, the AR HMD may include an AR display such as an optical see-through or video see-through display that supplements video of the user's real world environment with overlaid digital objects. For example, the AR display may include a transparent OLED or LED screen that uses a waveguide or light guide to display digital objects overlaid over the real-world environment.

As used herein, the term "virtual reality" or "VR" generally refers to a simulation of a user's presence in an environment, real or imaginary, such that the user may interact with it.

As used herein, the term "augmented reality" or "AR" generally refers to a view of a physical, real-world environment that is augmented or supplemented by computer-generated or digital information such as video, sound, and graphics. The digital information is directly registered in the user's physical, real-world environment such that the user may interact with the digital information in real time. The digital information may take the form of images, audio, haptic feedback, video, text, etc. For example, three-dimensional representations of digital objects may be overlaid over the user's view of the real-world environment in real time.

Figure 6:
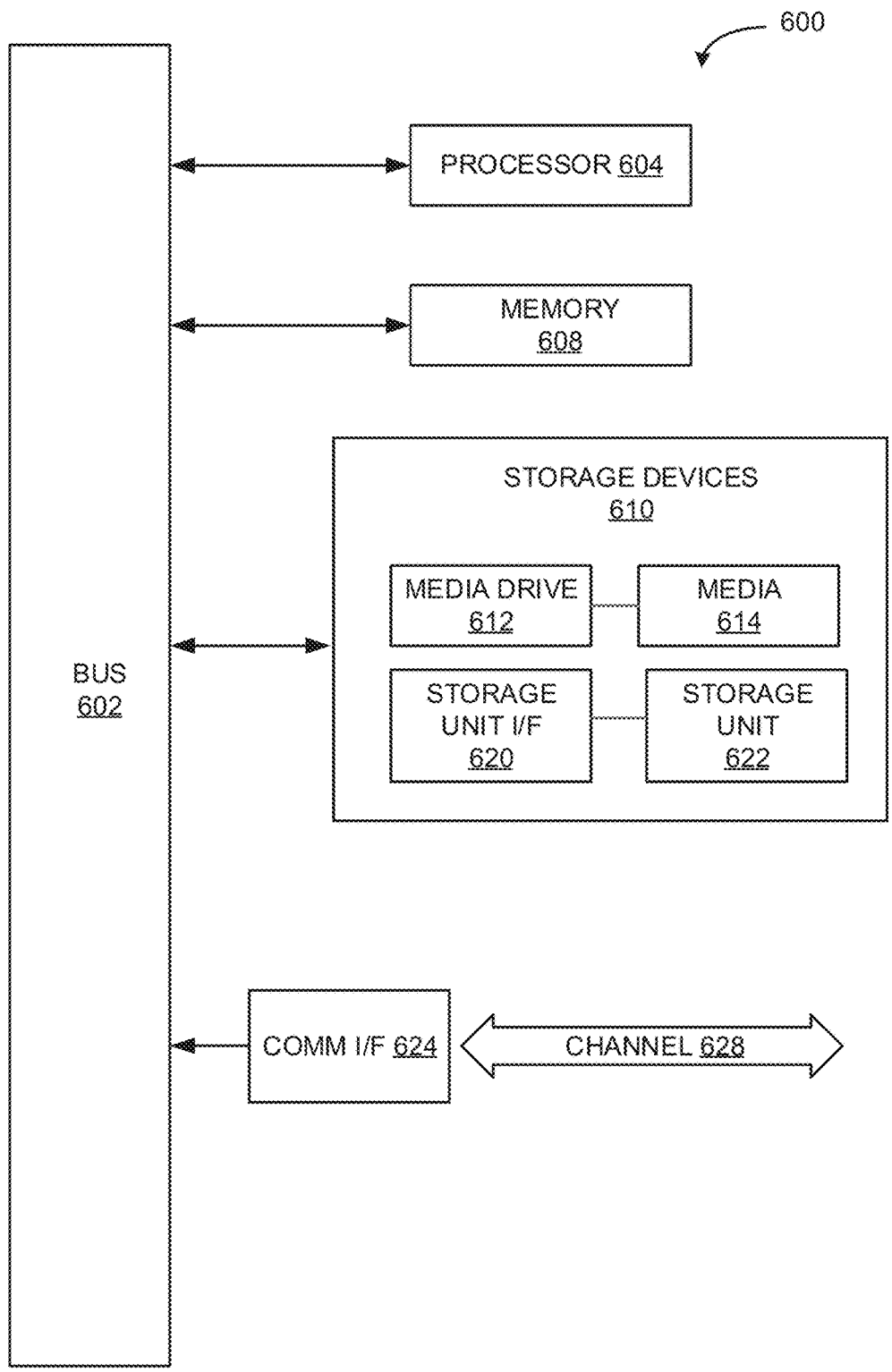
FIG. 6 illustrates an example computing module that may be used to implement various features of the methods disclosed herein.

FIG. 6 illustrates an example computing module that may be used to implement various features of the methods disclosed herein.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 6. Various embodiments are described in terms of this example-computing module 600. After reading this description, it will become apparent to a person skilled in the relevant art how to implement the application using other computing modules or architectures.

Referring now to FIG. 6, computing module 600 may represent, for example, computing or processing capabilities found within desktop, laptop, notebook, and tablet computers; hand-held computing devices (tablets, PDA's, smart phones, cell phones, palmtops, etc.); wearable devices (e.g., HMD); mainframes, supercomputers, workstations or servers; or any other type of special-purpose or general-purpose computing devices as may be desirable or appropriate for a given application or environment. Computing module 600 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 600 might include, for example, one or more processors, controllers, control modules, or other processing devices, such as a processor 604. Processor 604 might be implemented using a general-purpose or special-purpose processing engine such as, for example, a microprocessor, controller, or other control logic. In the illustrated example, processor 604 is connected to a bus 602, although any communication medium can be used to facilitate interaction with other components of computing module 600 or to communicate externally.

Computing module 600 might also include one or more memory modules, simply referred to herein as main memory 608. For example, preferably random access memory (RAM) or other dynamic memory, might be used for storing information and instructions to be executed by processor 604. Main memory 608 might also be used for storing temporary variables or other intermediate information during execution of instructions to be executed by processor 604. Computing module 600 might likewise include a read only memory ("ROM") or other static storage device coupled to bus 602 for storing static information and instructions for processor 604.

The computing module 600 might also include one or more various forms of information storage mechanism 610, which might include, for example, a media drive 612 and a storage unit interface 620. The media drive 612 might include a drive or other mechanism to support fixed or removable storage media 614. For example, a hard disk drive, a solid state drive, a magnetic tape drive, an optical disk drive, a CD or DVD drive (R or RW), or other removable or fixed media drive might be provided. Accordingly, storage media 614 might include, for example, a hard disk, a solid state drive, magnetic tape, cartridge, optical disk, a CD, DVD, or Blu-ray, or other fixed or removable medium that is read by, written to or accessed by media drive 612. As these examples illustrate, the storage media 614 can include a computer usable storage medium having stored therein computer software or data.

In alternative embodiments, information storage mechanism 610 might include other similar instrumentalities for allowing computer programs or other instructions or data to be loaded into computing module 600. Such instrumentalities might include, for example, a fixed or removable storage unit 622 and an interface 620. Examples of such storage units 622 and interfaces 620 can include a program cartridge and cartridge interface, a removable memory (for example, a flash memory or other removable memory module) and memory slot, a PCMCIA slot and card, and other fixed or removable storage units 622 and interfaces 620 that allow software and data to be transferred from the storage unit 622 to computing module 600.

Computing module 600 might also include a communications interface 624. Communications interface 624 might be used to allow software and data to be transferred between computing module 600 and external devices. Examples of communications interface 624 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 624 might typically be carried on signals, which can be electronic, electromagnetic (which includes optical) or other signals capable of being exchanged by a given communications interface 624. These signals might be provided to communications interface 624 via a channel 628. This channel 628 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer readable medium", "computer usable medium" and "computer program medium" are used to generally refer to non-transitory media, volatile or non-volatile, such as, for example, memory 608, storage unit 622, and media 614. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 600 to perform features or functions of the present application as discussed herein.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

While various embodiments of the present disclosure have been described above, it should be understood that they have been presented by way of example only, and not of limitation. Likewise, the various diagrams may depict an example architectural or other configuration for the disclosure, which is done to aid in understanding the features and functionality that can be included in the disclosure. The disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present disclosure. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosure, whether or not such embodiments are described and whether or not such features are presented as being a part of a described embodiment. Thus, the breadth and scope of the present disclosure should not be limited by any of the above-described exemplary embodiments.

What is claimed is:

1. A method comprising:
   providing content to a headmounted display (HMD);
   determining a first air flow effect based on the content;
   configuring an unmanned vehicle to generate the first air flow effect, wherein the unmanned vehicle includes:
      a drive system configured to position the unmanned vehicle, and
      an air flow unit configured to generate the first air flow effect;
   activating the air flow unit to generate the first air flow effect toward a user of the HMD, wherein the air flow effect enhances the content.

2. The method of claim 1, further comprising:
   presenting the content on the HMD; and
   synchronizing presentation of the content with the first air flow effect.

3. The method of claim 2, wherein the first air flow effect is generated in response to the content presented on the HMD reaching a predetermined time.

4. The method of claim 1, where the first air flow effect simulates a part of the content.

5. The method of claim 1, wherein the first air flow effect is generated in response to the user interacting with the content.

6. The method of claim 1, wherein the unmanned vehicle is an unmanned aerial vehicle (UAV), and wherein configuring the UAV in preparation for generating the first air flow effect includes configuring an air flow parameter of the air flow unit.

7. The method of claim 6, further comprising:
   positioning the UAV relative to a position of the user;
   positioning a second UAV relative to the position of the user; and
   after positioning the second UAV, using the second UAV to generate a second air flow effect, wherein the first air flow effect and the second air flow effect are synchronized in time.

8. The method of claim 6, further comprising positioning a second UAV carrying an object such that the object contacts the user during generation of the first air flow effect.

9. The method of claim 8, further comprising:
   presenting the content on the HMD; and
   synchronizing presentation of the content with the contact of the object with the user.

10. The method of claim 1, wherein the air flow unit comprises a plurality of air flow generators, and wherein configuring an air flow parameter of the air flow unit includes activating a predetermined number of air flow generators based on the first air flow effect.

11. The method of claim 1, wherein generating the first air flow effect comprises generating mist.

12. The method of claim 1, wherein generating the first air flow effect comprises generating a smell.

13. A system comprising:
   a headmounted display (HMD) configured to display content;
   a processing element configured to determine a first air flow effect based on the content;
   an unmanned vehicle configured to generate the first air flow effect, wherein the unmanned vehicle includes:
      a drive system configured to position the unmanned vehicle with respect to the HMD, and
      an air flow unit configured to generate the first air flow effect, wherein activating the air flow unit to generate the first air flow effect toward a user of the HMD enhances the content.

14. The system of claim 13, wherein the air flow unit comprises a plurality of air flow generators.

15. The system of claim 14, wherein the plurality of air flow generators of the air flow unit comprises a first airflow generator and a second airflow generator.

16. The system of claim 15, wherein the first and second airflow generators are rotatable to a position to combine airflows produced by the first and second airflow generators to generate a stronger airflow effect.

17. The system of claim 15, wherein the first and second airflow generators are rotatable to a position to generate a wider air flow effect.

18. The system of claim 13, wherein the content is configured to be presented on the HMD in synchronization with a generation of the first air flow effect.

19. The system of claim 13 further comprising:
   a second unmanned vehicle configured to be positioned relative to a position of the user, wherein the second unmanned vehicle is configured to generate a second air flow effect, wherein the first air flow effect and the second air flow effect are synchronized in time.

20. The system of claim 19, wherein the first and second unmanned vehicles are positioned in a column such that the first and second air flow effects are combined to generate a stronger air flow effect.

21. The system of claim 19, wherein the first and second unmanned vehicles are positioned side-to-side such that the first air flow effect and the second air flow effect together simulate an air movement of a linear object.

22. The system of claim 13, wherein the unmanned vehicle is an unmanned aerial vehicle.

* * * * *